Patented Aug. 28, 1951

2,565,897

UNITED STATES PATENT OFFICE 2,565,897

DRIER COMPOSITIONS

Gordon K. Wheeler, Norwalk, Conn., assignor to R. T. Vanderbilt Co., Inc., New York, N. Y., a corporation of New York No Drawing. Application August 20, 1948, Serial No. 45,422

18 Claims. (Cl. 106—264)

This invention relates to improved drier compositions and to other compositions containing the same.

Certain drying oil compositions, due chiefly to their chemical composition, do not dry as rapidly as is often desirable. Other drying oil compositions such as paints and printing inks frequently exhibit poor drying time stability upon aging. These factors tend to limit the utility of many drying oil compositions.

Certain metallic salts of metals, such as naphthenates, oleates and octoates of lead, cobalt, calcium, and manganese accelerate the drying rate of drying oil compositions. It is well known in the art, however, that the use of a combination of two or more individual metallic driers is usually necessary in order to obtain satisfactory drying of oils, paints, varnishes, and other drying oil compositions. However, due to certain considerations such as reactivity, color, poor durability upon exposure to heat, light, moisture, and chemicals, etc., it is often desirable to limit the amount of metallic driers in the composition.

The foregoing being in brief the state of the art, it is therefore the primary object of the present invention to provide drier compositions of improved drying rate without the use of a combination of two or more metallic driers.

It is also an object of this invention to provide improved compositions of the type commonly employed in varnishes, enamels, paints, printing inks and linoleum print paints containing reduced amounts of metallic driers.

It is a further object of this invention to provide drying oil coating compositions having good drying time stability.

The primary object of the present invention is accomplished by preparing a mixture the active ingredients of which consist essentially of o-phenanthroline monohydrate, o-phenanthroline or alpha, alpha'-dipyridyl and a conventional manganese drier in suitable proportions. As is understood in the art, o-phenanthroline is a compound having the structural formula

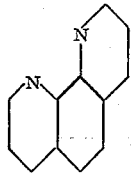

and alpha, alpha'-dipyridyl is a compound having the structural formula

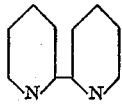

Other objects of the present invention are accomplished by preparing a drying oil or related composition, suitable for use as a varnish, enamel, paint, printing ink or linoleum print paint and containing the aforementioned mixture.

The following disclosure teaches in detail the preparation of a variety of compositions which fall within the scope of the present invention. Example I describes the method of determining the drying rates of the compositions prepared as described in the remaining examples, wherein the parts are given by weight, the viscosities are on the Gardner-Holdt scale, and the film hardness is reported as per cent based on plate glass as 100% as determined by the Sward Hardness rocker. There are of course forms of the invention other than the following specific embodiments.

Example I

Within 15–72 hours after preparation of the compositions, a film is applied on a polished plate glass panel by means of a 0.004 inch "Bird" film applicator which delivers a wet film thickness of approximately 0.0022 inch, depending upon the viscosity and flow characteristics of the composition being tested. The film is allowed to dry under a constant artificial light source consisting of two 100-watt incandescent lamps suspended five feet above the panels and five feet apart in a room wherein the relative humidity is maintained at 50% and the temperature at 70° F. The air within the room is renewed approximately every two minutes.

The drying times of the films are determined by a weighted-felt method wherein a strip of cotton flannel one inch wide and two and one-half inches long is fastened to a 10-gram block of wood one inch square on the bottom so that the bottom face of the block is completely covered by the flannel with the lint side exposed. The flannel covered block is then carefully placed on the film, with the flannel covered bottom face in contact with the film, and allowed to remain there for 300±three seconds, after which time the panel is inverted by rotating in a direction 90° to a line passing through the length of the flannel, the time consumed in the operation being approximately two seconds. Tests are made at half-hour intervals during the first four hours, one hour intervals during the next four hours, and at two hour intervals during the next twelve hours.

The film is considered to be dry if the flannel covered block drops off immediately upon inversion of the panel and this dry-point will hereinafter be referred to as the 10-gram lint-free drying time, abbreviated 10-gm. L. F. D. T. A 500-gram lint-free drying time, abbreviated 500-gm.

L. F. D. T., is similarly determined by placing a 490-gram lead weight on top of the 10-gram block for a period of 300±three seconds and then removing this weight before inverting the panel, with the exception that the tests are made at half-hour intervals for the first eight to twelve hours, at one-hour intervals for the next eight hours, at two-hour intervals for the next eight hours, and at four-hour intervals for the balance of the testing period. In some instances it is desirable to make tests between these intervals depending upon the expected drying time of the composition being tested.

*Example II*

The use of o-phenanthroline monohydrate in combination with a manganese drier to modify an enamel containing a vehicle composed of linseed oil and a modified phenolic resin and pigmented with titanium dioxide is shown by this example.

Three separate modified phenolic resin linseed oil vehicles having oil lengths (gallons of oil per 100 pounds of resin) of 12.5, 18.75, and 25 gallons respectively are prepared by heating Z-bodied linseed oil with a rosin modified phenolic resin (high viscosity, melting point 161–169° C.) to a temperature of 500° F. in about 30 minutes. The mixture is allowed to cool to 390° F. and is then thinned with mineral spirits. For the 12.5 gallon length vehicle 300 parts of oil, 300 parts of resin, and 400 parts of mineral spirits are employed; for the 18.75 gallon length vehicle 350 parts of oil, 250 parts of resin, and 400 parts of mineral spirits are used; and for the 25 gallon length vehicle 400 parts of oil, 200 parts of resin, and 400 parts of mineral spirits are employed. These vehicles contain 60% solids. Enamels containing equal parts of oil and pigment are prepared in the usual manner using these vehicles as follows:

| Vehicle Oil Length | 12.5 Gals. | 18.75 Gals. | 25 Gals. |
| --- | --- | --- | --- |
|  | Parts | Parts | Parts |
| Pure Rutile TiO2 | 300 | 300 | 300 |
| Vehicle | 700 | 580 | 520 |
| Mineral Spirits |  | 120 | 180 |
|  | 1,000 | 1,000 | 1,000 |

To separate parts of each of these three enamels are added three separate metallic drier and/or modifier combinations, namely, (1) 18.9 parts of a 5% solution of o-phenanthroline monohydrate (dissolved in a mixture of equal parts of butyl alcohol and toluene wherein the o-phenanthroline monohydrate is first dissolved by warming in the butyl alcohol and the toluene then added) per 1000 parts of the enamels; (2) 4.8 parts of a 4% manganese naphthenate solution per 1000 parts of the enamels; (3) 5.745 parts of a mixture of manganese naphthenate and o-phenanthroline monohydrate, prepared by dissolving, by warming, 9.45 parts of the modifier with 48.0 parts of 4% manganese naphthenate drier solution, per 1000 parts of the enamels. The above solutions are equivalent to concentrations of 0.09% manganese metal and 0.45% o-phenanthroline monohydrate based on the oil content of the enamels.

The enamels are tested according to the manner described in Example I and it is found that the enamels containing manganese naphthenate in combination with o-phenanthroline monohydrate exhibit greatly accelerated 500-gram lint-free drying times in contrast to those enamels containing only manganese or o-phenanthroline monohydrate as drier. Typical 500-gram L. F. D. T.'s for these enamels are as follows:

| Vehicle Oil Length | 500-Gm. L. F. D. T. | | |
| --- | --- | --- | --- |
|  | Modifier Only | Mn Only | Mn+ Modifier |
|  | Hours | Hours | Hours |
| 12.5 Gals | +196 | 18 | 3 |
| 18.75 Gals | +196 | 72 | 5 |
| 25 Gals | +196 | 144 | 8 |

*Example III*

The use of o-phenanthroline monohydrate in combination with a manganese drier to reduce the amount, and replace a combination, of metallic driers in a paint containing a vehicle, composed of linseed oil and a modified phenolic resin, pigmented with titanium dioxide is illustrated by this example.

A twelve and one-half gallon oil length vehicle of viscosity U and acid number 12 is prepared by heating 100 parts of Z-bodied linseed oil with 100 parts of a rosin-modified phenolic resin (high viscosity, melting point 161–169° C.) to a temperature of 500° F. in about 30 minutes. The mixture is allowed to cool to 390° F. and 133 parts of mineral spirits are added with mixing. To 150 parts of this vehicle are added 300 parts of pure rutile titanium dioxide with thorough mixing and the resulting paste is then given two passes through a high speed three-roll paint mill. Three enamels are prepared as follows: (1) To 45 parts of the paste are added 55 parts of the vehicle, 1.26 parts of 10% lead naphthenate solution, and 1.05 parts of 1.0% cobalt naphthenate solution to give 0.6% lead and 0.05% cobalt metal based on the oil content of the enamel. (2) To 45 parts of the paste are added 55 parts of the vehicle and 1.92 parts of 4% manganese naphthenate solution to give 0.36% manganese metal by weight, based on the oil content of the enamel. (3) To 45 parts of the paste are added 55 parts of the vehicle and 5.745 parts of a mixture of o-phenanthroline monohydrate and manganese naphthenate prepared by dissolving, by warming, 9.45 parts of the modifier in 48.0 parts of 4% manganese naphthenate drier solution. This amount of manganese-modifier mixture is equivalent to 0.45% o-phenanthroline monohydrate and 0.09% manganese metal by weight, based on the oil content of the enamel.

The enamels are tested according to the method described in Example I and it is found that the enamel containing o-phenanthroline monohydrate in combination with manganese naphthenate exhibits a greatly accelerated drying rate and improved drying time stability in comparison to the paint containing a combination of two metallic driers or the paint containing a large amount of manganese naphthenate drier. Typical drying rates for these enamels are as follows:

| Drier | 500 Gm. L. F. D. T. | | |
| --- | --- | --- | --- |
|  | Initial | 4 weeks | 8 weeks |
|  | Hours | Hours | Hours |
| Lead+Cobalt | 16 | 20 | 24 |
| Manganese | 12 | 11½ | 12 |
| Modifier+Manganese | 4 | 4 | 3½ |

Example IV

The use of o-phenanthroline monohydrate in combination with a manganese drier to modify a baking enamel pigmented with titanium dioxide and containing a modified phenolic resin linseed oil vehicle is illustrated in this example.

Films of the enamels described in Example II are applied according to the manner described in Example I and are baked at 200° F. for 0.5 hours. The films are allowed to cool and are then tested with a "Sward" hardness rocker in the usual manner. It is found that the enamels containing manganese naphthenate drier in combination with o-phenanthroline monohydrate give harder films than the corresponding enamels containing only manganese naphthenate or o-phenanthroline monohydrate. Typical results of the baking tests are as follows:

| Vehicle Oil Length | "Sward" Hardness | | |
| --- | --- | --- | --- |
|  | Modifier Only | Manganese Only | Manganese+ Modifier |
| 12.5 Gals | 10 | 20 | 24 |
| 18.75 Gals | 0 | 10 | 16 |
| 25 Gals | 0 | 2 | 10 |

Example V

The use of o-phenanthroline monohydrate in combination with a manganese drier to modify an oleoresinous enamel based on a modified phenolic resin linseed oil vehicle and pigmented with carbon black is illustrated by this example.

A mixture of 12.5 parts of carbon black pigment (diphenyl guanidine adsorption index=55) and 355 parts of a twelve and one-half gallon modified phenolic resin Z-bodied linseed oil vehicle, described in Example II, and 50 parts of mineral spirits is ground in a ball mill for 96 hours. To three separate parts of this enamel are added three separate metallic drier and/or modifier combinations, namely, (1) 18.9 parts of a 5% solution of o-phenanthroline monohydrate (dissolved in a mixture of equal parts of butyl alcohol and toluene wherein the o-phenanthroline monohydrate is first dissolved by warming in the butyl alcohol and the toluene then added) per 700 parts of the enamel; (2) 4.8 parts of a 4% manganese naphthenate solution per 700 parts of the enamel; and (3) 5.745 parts of a mixture of manganese naphthenate and o-phenanthroline monohydrate, prepared by dissolving, by warming, 9.45 parts of the modifier with 48.0 parts of 4% manganese naphthenate drier solution, per 700 parts of the enamel.

The enamels are tested according to the manner described in Example I and it is found that the enamel containing manganese naphthenate in combination with o-phenanthroline monohydrate exhibits greatly accelerated 500-gm. L. F. D. T. in contrast to the enamels containing only manganese naphthenate or o-phenanthroline monohydrate. Typical 500-gram lint-free drying times are:

|  | 500-gm. L. F. D. T. | | |
| --- | --- | --- | --- |
|  | Initial | 4 weeks | 12 weeks |
|  | Hours | Hours | Hours |
| Modifier only | +96 | +96 | +96 |
| Manganese only | 28 | 28 | 20 |
| Manganese+Modifier | 5 | 8 | 6½ |

Example VI

This example illustrates the use of o-phenanthroline monohydrate in combination with manganese naphthenate to modify an enamel pigmented with a toluidine toner and containing a modified phenolic resin linseed oil vehicle.

A mixture of 100 parts of toluidine toner pigment (sp. gr. 1.34, oil absorption 31) and 100 parts of a twelve and one-half gallon modified phenolic resin Z-bodied linseed oil vehicle, described in Example II, is ground on a high speed three-roll paint mill in the usual manner. To 200 parts of this paste are added 596 parts of the vehicle. To three separate portions of this enamel, of 796 parts each, are added (1) 19 parts of a 5% solution of o-phenanthroline monohydrate dissolved in a mixture of equal parts of butyl alcohol and toluene in the usual manner, (2) 5.0 parts of a 4% manganese naphthenate solution, and (3) 6.0 parts of a mixture of o-phenanthroline monohydrate and manganese naphthenate prepared by warming 1.0 parts of the modifier with 5.0 parts of a 4% manganese naphthenate drier solution until completely dissolved.

The enamels are tested according to the manner described in Example I and it is found that the enamel containing manganese naphthenate in combination with o-phenanthroline monohydrate exhibits greatly accelerated 500-gram lint-free drying time in comparison to the enamels containing only manganese naphthenate or o-phenanthroline monohydrate as drier.

Typical results of the drying tests for these enamels are as follows:

| Drier | 500-Gm. L. F. D. T. | |
| --- | --- | --- |
|  | Initial | 12 weeks |
|  | Hours | Hours |
| Modifier only | +96 | +96 |
| Manganese only | 24 | 24 |
| Modifier + Manganese | 3 | 3½ |

Example VII

The use of alpha, alpha'-dipyridyl in combination with a manganese drier to modify an enamel containing a vehicle composed of linseed oil and a modified phenolic resin and pigmented with titanium dioxide is shown by this example.

A twelve and one-half gallon oil length vehicle of viscosity U and acid number 12 is prepared by heating 100 parts of Z-bodied linseed oil with 100 parts of a rosin-modified phenolic resin (high viscosity, melting point 161–169° C.) to a temperature of 500° F., in about 30 minutes. The mixture is allowed to cool to 390° F. and 133 parts of mineral spirits are added with mixing. To 150 parts of this vehicle are added 300 parts of pure rutile titanium dioxide with thorough mixing and the resulting paste is then given two passes through a high speed three-roll paint mill. To 450 parts of this paste are added 550 parts of the vehicle. To three separate parts of this finished enamel (1022.9 parts each) are added (1) 18.9 parts of a 5% solution of alpha, alpha'-dipyridyl prepared by dissolving 5 parts of alpha, alpha'-dipyridyl in 47.5 parts of warm butyl alcohol and adding 47.5 parts of toluene, (2) 4.8 parts of a 4% manganese naphthenate solution, and (3) 5.745 parts of a mixture of manganese naphthenate and alpha, alpha'-dipyridyl, prepared by warming 9.45 parts of the modifier in 48.0 parts of 4% manganese naphthenate drier solution until completely dissolved.

The enamels are tested according to the manner described in Example I and it is found that the enamel containing manganese naphthenate in combination with alpha, alpha'-dipyridyl exhibits a greatly accelerated 500-gm. lint-free drying time in comparison to the enamels containing only manganese naphthenate or alpha, alpha'-dipyridyl as drier.

Typical 500-gm. lint-free drying times for these enamels are as follows:

| Driers | 500-gm. L. F. D. T. | | |
|---|---|---|---|
| | Initial | 4 weeks | 8 weeks |
| | Hours | Hours | Hours |
| Modifier only | +72 | +72 | +72 |
| Manganese only | 18 | 18 | 20 |
| Modifier + Manganese | 2½ | 3 | 3 |

*Example VIII*

The use of alpha, alpha'-dipyridyl in combination with a manganese drier to modify a baking enamel pigmented with titanium dioxide and containing a modified phenolic resin linseed oil vehicle is illustrated in this example.

Films of the enamels described in Example VII are applied according to the manner described in Example I and are baked at 200° F. for 0.5 hours. The films are allowed to cool and are then tested with a "Sward" hardness rocker in the usual manner. It is found that the enamels containing alpha, alpha'-dipyridyl in combination with manganese naphthenate give harder films than the enamels containing only manganese naphthenate or alpha, alpha'-dipyridyl. Typical results of the baking test are as follows:

| Drier | "Sward" Hardness |
|---|---|
| Modifier only | 10 |
| Manganese only | 20 |
| Modifier+manganese | 26 |

*Example IX*

This example illustrates the use of o-phenanthroline monohydrate in combination with manganese naphthenate to modify a carbon black pigmented pentaerythritol phthalic oil modified alkyd enamel.

A mixture of 25 parts of carbon black pigment (diphenyl guanidine adsorption index=55), 710 parts of pentaerythritol phthalic oil modified alkyd solution containing 70% solids, and 100 parts of mineral spirits is ground in a ball mill for 96 hours. To three separate parts of this enamel, 835 parts each, are added, (1) 20 parts of a 5% solution of o-phenanthroline monohydrate dissolved, in the usual manner, in a mixture of butyl alcohol and toluene, (2) 5.0 parts of a 4% manganese naphthenate solution, and (3) 6.0 parts of a mixture of o-phenanthroline monohydrate and manganese naphthenate prepared by warming 1.0 part of the modifier with 5.0 parts of a 4% manganese naphthenate drier solution until completely dissolved.

The enamels are tested in the usual manner and it is found that the enamel containing o-phenanthroline monohydrate in combination with manganese naphthenate exhibits a greatly accelerated drying rate in comparison to those enamels containing only o-phenanthroline monohydrate or manganese as drier. Typical 500-gm. lint-free drying times for these enamels are as follows:

| Drier | 500-gm. L. F. D. T. | | |
|---|---|---|---|
| | Initial | 4 weeks | 8 weeks |
| | Hours | Hours | Hours |
| Modifier only | +120 | +120 | +120 |
| Manganese only | 12 | 20 | 20 |
| Modifier+Manganese | 5.5 | 7.5 | 6.5 |

*Example X*

The following example illustrates the use of o-phenanthroline monohydrate in combination with manganese naphthenate to modify an enamel based on a vehicle composed of maleic resin and a chemically modified soya bean oil.

A twenty-five gallon oil length vehicle of viscosity U and acid number 6 is prepared by heating 400 parts of a chemically modified soya bean oil (iodine value 120-125, acid number 10-14) to 560-580° F. in about 45 minutes. This temperature is maintained until a complete string is obtained and the reaction is checked by adding 200 parts of a maleic resin (a maleic modified pentaerythritol ester of rosin, acid number 12-14, softening point 155-160° C.) and the temperature held above 500° F. for 15 minutes. The mixture is allowed to cool to 390° F. and 400 parts of mineral spirits are added with mixing. To 75 parts of this vehicle are added 150 parts of pure rutile titanium dioxide with thorough mixing and the resulting paste is given two passes through a high speed three-roll paint mill. To 225 parts of this paste are added 275 parts of the vehicle. To three separate parts of this enamel (514.75 parts each) are added (1) 10 parts of a 5% solution of o-phenanthroline monohydrate dissolved in a mixture of equal parts of butyl alcohol and toluene wherein the o-phenanthroline monohydrate is first dissolved by warming in the butyl alcohol and the toluene then added, (2) 3.14 parts of 4% manganese naphthenate solution, and (3) 3.64 parts of a mixture of manganese naphthenate and o-phenanthroline monohydrate prepared by dissolving, by warming, 5.0 parts of the modifier in 31.4 parts of 4% manganese naphthenate drier solution.

The enamels are tested according to the manner described in Example I and it is found that the enamel containing manganese naphthenate in combination with o-phenanthroline monohydrate exhibits a greatly accelerated 500-gm. lint-free drying time in comparison to the enamels containing only manganese naphthenate or o-phenanthroline monohydrate as drier.

Typical drying results for the enamels are as follows:

| Drier | 500-gm. L. F. D. T. | | |
|---|---|---|---|
| | Initial | 4 weeks | 8 weeks |
| | Hours | Hours | Hours |
| Modifier only | 72 | 42 | 57 |
| Manganese only | 32 | 27 | 42 |
| Modifier+Manganese | 6.5 | 4 | 5½ |

Various modifications may be made in the specific teachings of the examples to provide additional drier compositions falling within the scope of the present invention. Thus, o-phenanthroline may be used instead of its monohydrate or alpha, alpha'-dipyridyl. Also, any conventional manganese salt of an organic acid, commonly employed in the art as a drier, may be used as an ingredient of the drier composition, for example, manganese naphthenate, manganese oleate, manganese linoleate, manganese octoate, manganese resinate, etc. The weight ratio of o-phenanthroline monohydrate, o-phenanthroline or alpha, alpha'-dipyridyl to manganese metal contained in the drier composition should be within the range from about 0.5 to about 10.0, and should preferably be within the range from about 2.0 to about 5.0. The drier composition may be prepared by mixing the o-phenanthroline monohydrate, o-phenanthroline or alpha, alpha'-dipyridyl and manganese salt, or by dissolving them in a suitable common solvent which does not have an adverse effect upon the conventional film-forming bases containing drying or semi-drying oil fatty acid radicals. Hence, as such solvent there may be used a drying or semi-drying oil (e. g., linseed oil, dehydrated castor oil, soya bean oil, China-wood oil, oiticica oil, perilla oil, etc.), a drying or semi-drying oil fatty acid (e. g., linseed oil fatty acids, dehydrated castor oil fatty acids, China-wood oil fatty acids, soya bean oil fatty acids, oiticica oil fatty acids, linoleic acid, linolenic acid, oleic acid, etc.), a mixture of butyl alcohol and benzene, toluene, the xylenes, etc.

The drier composition of the present invention may be used with advantage in film-forming bases of the type employed in varnishes, enamels, paints, printing inks and linoleum print paints containing a drying or semi-drying oil fatty acid radical. When so used, the film forming base should preferably contain manganese metal within the range from about 0.05 to about 0.25% by weight, based upon the drying oil or semi-drying oil fatty acid radical content of the base.

The film-forming base may be prepared using any of the drying or semi-drying oils, such as linseed oil, dehydrated castor oil, soyal bean oil, China-wood oil, oiticica oil, sunflower oil, perilla oil, cashew nut oil, etc., either raw, blown, heat-bodied or otherwise conventionally modified. In addition, the film-forming base may be prepared using the esters of the acids derived from the drying or semi-drying oils and polyhydric alcohols, such as glycerol, ethylene glycol, pentaerythritol, dipentaerythritol, sorbitol, mannitol, erythritol, etc. The film-forming base, if desired, may also be prepared using the pure esters of the drying or semi-drying oil fatty acids such as linoleic acid, oleic acid, linolenic acid, ricinoleic acid, eleostearic acid, etc., and polyhydric alcohols, such as ethylene glycol, glycerol, pentaerythritol, dipentaerythritol, sorbitol, mannitol, erythritol, etc. As the examples further illustrate, the film-forming base may also be prepared from the drying or semi-drying oil modified resins which are customarily used in the art, such as the modified alkyd resins prepared, for example, by the esterification of glycerol, phthalic anhydride and drying or semi-drying oil fatty acids; the modified phenolic resins prepared, for example, by the reaction of cresols, formaldehyde and the drying or semi-drying oils; the modified esters of rosin or modified (hydrogenated, isomerized, polymerized, etc.) rosins prepared, for example, by the esterification of rosin, glycerol or pentaerythritol, and the drying or semi-drying oil fatty acids; etc.

The film-forming base of the present invention may also, if desired, include the usual pigments (e. g., titanium dioxide, calcium sulfate, zinc oxide, carbon black, chrome green, red iron oxide, etc.), extenders and fillers (e. g., calcium carbonate, clay, cork, wood flour, etc.), resins (e. g., para-tertiary butyl or amyl phenol-formaldehyde, urea-formaldehyde, rosin, copal, kauri, congo, manlia, dammar, etc.), solvents (e. g., butyl alcohol, toluene, xylol, turpentine, etc.), thinners such as mineral spirits, plasticizers, etc.

I claim:
1. A drier composition the active drying constituents of which consist essentially of a mixture of a manganese drier and a modifier selected from the group consisting of o-phenanthroline, a-phenanthroline monohydrate and alpha, alpha'-dipyridyl, the weight ratio of said modifier to the manganese contained in said manganese drier being within the range from about 0.5 to about 10.0.

2. A drier composition the active drying constituents of which consist essentiall of a mixture of a manganese drier and o-phenanthroline as a modifier, the weight ratio of said modifier to the manganese contained in said manganese drier being within the range from about 0.5 to about 10.0.

3. The composition of claim 2, in which the manganese drier is manganese naphthenate.

4. The composition of claim 3, in which the weight ratio of o-phenanthroline to the manganese contained in the manganese naphthenate is within the range from about 2.0 to about 5.0.

5. A drier composition the active drying constituents of which consist essentially of a mixture of a manganese drier and o-phenanthroline monohydrate as a modifier, the weight ratio of said modifier to the manganese contained in said manganese drier being within the range from about 0.5 to about 10.0.

6. The composition of claim 5, in which the manganese drier is manganese naphthenate.

7. The composition of claim 6, in which the weight ratio of o-phenanthroline monohydrate to the manganese contained in the manganese naphthenate is within the range from about 2.0 to about 5.0.

8. A drier composition the active drying constituents of which consist essentially of a mixture of a manganese drier and alpha, alpha'-dipyridyl as a modifier, the weight ratio of said modifier to the manganese contained in said manganese drier being within the range from about 0.5 to about 10.0.

9. The composition of claim 8, in which the manganese drier is manganese naphthenate.

10. The composition of claim 9, in which the weight ratio of alpha, alpha'-dipyridyl to the manganese contained in the manganese naphthenate is within the range from about 2.0 to about 5.0.

11. A drier composition the active drying constituents of which consist essentially of a mixture of a manganese drier and a modifier selected from the group consisting of o-phenanthroline, o-phenanthroline monohydrate and alpha, alpha'-dipyridyl, the weight ratio of said modifier to the manganese contained in said manganese drier being within the range from about 2.0 to about 5.0.

12. A film-forming base, of the type commonly employed in varnishes, enamels, paints, printing inks and linoleum print paints, prepared from an ester of a saturated, aliphatic, polyhydric alcohol, said ester containing a substituent selected from the group consisting of the drying and semi-drying oil fatty acid radicals, said film forming base containing as a drier a mixture consisting essentially of a manganese drier and a modifier selected from the group consisting of o-phenanthroline, o-phenanthroline monohydrate and alpha, alpha'-dipyridyl, the weight ratio of said modifier to the manganese contained in said manganese drier being within the range from about 0.5 to about 10.0.

13. A film-forming base, of the type commonly employed in varnishes, enamels, paints, printing inks and linoleum print paints, prepared from an ester of a saturated, aliphatic, polyhydric alcohol, said ester containing a substituent selected from the group consisting of the drying and semi-drying oil fatty acid radicals, said film forming base containing as a drier a mixture consisting essentially of a manganese drier and o-phenanthroline as a modifier, the weight ratio of said modifier to the manganese contained in said manganese drier being within the range from about 0.5 to about 10.0.

14. The composition of claim 13, in which the manganese drier is manganese naphthenate.

15. A film-forming base, of the type commonly employed in varnishes, enamels, paints, printing inks and linoleum print paints, prepared from an ester of a saturated, aliphatic, polyhydric alcohol, said ester containing a substituent selected from the group consisting of the drying and semi-drying oil fatty acid radicals, said film forming base containing as a drier a mixture consisting essentially of a manganese drier and o-phenanthroline monohydrate as a modifier, the weight ratio of said modifier to the manganese contained in said manganese drier being within the range from about 0.5 to about 10.0.

16. The composition of claim 15, in which the manganese drier is manganese naphthenate.

17. A film-forming base, of the type commonly employed in varnishes, enamels, paints, printing inks and linoleum print paints, prepared from an ester of a saturated, aliphatic, polyhydric alcohol, said ester containing a substituent selected from the group consisting of the drying and semi-drying oil fatty acid radicals, said film forming base containing as a drier a mixture consisting essentially of a manganese drier and alpha,-alpha'-dipyridyl as a modifier, the weight ratio of said modifier to the manganese contained in said manganese drier being within the range from about 0.5 to about 10.0.

18. The composition of claim 17, in which the manganese drier is manganese naphthenate.

GORDON K. WHEELER.

REFERENCES CITED

The following references are of record in the file of this patent:

UNITED STATES PATENTS

| Number | Name | Date |
|---|---|---|
| 2,075,230 | Schatz | Mar. 30, 1937 |
| 2,456,824 | Fischer | Dec. 21, 1948 |

OTHER REFERENCES

"Drying of Linseed Oil Paints," Nicholson, Industrial and Eng. Chem., vol. 34, pages 1175–1179.